Figure 1:
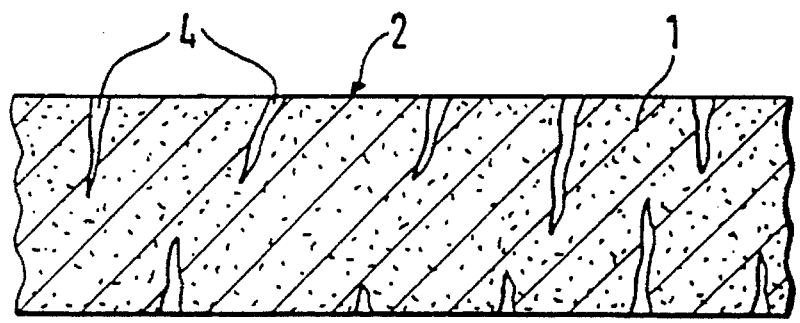

United States Patent [19]
Lindeberg

[11] Patent Number: 5,597,627
[45] Date of Patent: Jan. 28, 1997

[54] STONE PRODUCT IN SHEET FORM, METHOD FOR ITS MANUFACTURE AND APPROPRIATE MEANS

[75] Inventor: Jan-Inge Lindeberg, Styrsö, Sweden

[73] Assignee: Techstone i Kinna AB, Kinna, Sweden

[21] Appl. No.: 356,326

[22] PCT Filed: Jun. 2, 1993

[86] PCT No.: PCT/SE93/00487

§ 371 Date: Dec. 14, 1994

§ 102(e) Date: Dec. 14, 1994

[87] PCT Pub. No.: WO94/00651

PCT Pub. Date: Jan. 6, 1994

[30] Foreign Application Priority Data

Jun. 24, 1992 [SE] Sweden .................. 9201963

[51] Int. Cl.⁶ ........................................... B32B 9/00
[52] U.S. Cl. ..................... 428/15; 428/22; 428/49;
428/172; 428/173; 428/426; 428/542.2;
428/542.4; 428/542.6; 52/514; 52/612;
52/742.14; 125/1; 125/12; 264/102; 264/258
[58] Field of Search ................. 428/15, 22, 49,
428/173, 172, 426, 542.2, 542.4, 542.6;
52/743, 514, 612; 125/1, 12; 264/102, 258

[56] References Cited

U.S. PATENT DOCUMENTS

| 1,966,069 | 7/1934 | Klietoth | 181/284 |
| 4,060,953 | 12/1977 | Milne | 52/743 |
| 4,177,789 | 12/1979 | Marocco | 125/1 |
| 4,640,850 | 2/1987 | Marocco | 428/15 |
| 5,028,459 | 7/1991 | Lathrop | 428/15 |
| 5,244,850 | 9/1993 | Dutton | 501/128 |

Primary Examiner—Patrick Ryan
Assistant Examiner—Abraham Bahta
Attorney, Agent, or Firm—Dvorak and Traub

[57] ABSTRACT

The present invention relates to a stone product in sheet form suitable for use both outdoors and indoors, e.g. as a facade cladding or a fitting, etc. The stone product in question has undergone impregnation treatment with a view to causing its strength and flexibility to be increased through the presence of an impregnating agent in existing pores, cracks and other cavities in the stone sheet in question. A method for producing said stone product and means for its manufacture are also included in the invention.

11 Claims, 2 Drawing Sheets

STONE PRODUCT IN SHEET FORM, METHOD FOR ITS MANUFACTURE AND APPROPRIATE MEANS

The present invention relates to a stone product in sheet form suitable for use both outdoors and indoors, e.g. as a facade cladding or a fitting, etc.

Due to their relatively low strength, previously disclosed products of this kind are thick and, as a result, heavy. Also, the stone material is not so flexible as to be capable of withstanding bending and similar effects without fracturing.

U.S. Pat. No. 4,177,789 refers to a method for sawing thin sheets from a block of stone involving the application of a filling material in grooves previously sawn into the stone block and then sawing through the stone block between the filled grooves. The act of filling a plastic material into the saw grooves scarcely constitutes impregnation of the stone block, although a certain degree of strengthening of the surface of the stone block is achieved.

Danish patent specification 65 991 refers to the existence of pressed sound-insulating fibre sheets containing water-glass.

German patent application 1 057 946 refers to the sealing of pores in stone by the use of water-glass.

German patent application 1 954 787 refers to "Marmorite", which consists of one layer of natural stone and one layer of a substrate.

German patent application 2 258 111 refers to means for protecting parts of buildings against moisture by means of a waterproof silicate barrier.

German patent application 2 344 071 refers to the manufacture of facade panels from asbestos cement involving the use of water-glass as the surface layer.

U.S. Pat. No. 1,966,069 refers to the manufacture of a sound-absorbent brick/tile sheet containing, amongst other things, silicate for the purpose of, amongst other things, increasing its strength.

The main purpose of the present invention is to increase the internal strength and flexibility of each sheet of stone material without the need to use bearers to provide support during the processing of the stone material and also during its subsequent handling and use. This is made possible by the characteristic features indicated in each of the individual patent claims. More specifically, the natural bonding between the stone crystals of the stone is permanently filled and reinforced permanently with an impregnating agent, in conjunction with which the salts in question, which are present in the stone, are bonded, in so doing also preventing the precipitation of the salts with discoloration as a result.

According to the method described in the aforementioned U.S. Pat. No. 4,177,789, the filling material is applied temporarily, depending on the sawing operation to be performed on the stone sheets in question, to form a filling material in the saw grooves in order to provide support during the subsequent division of the Stone block in question between the layers of filling material.

Once division and polishing of each stone sheet has taken place, with the filling material still in position and acting as an effective support for the sheet, the filling material is removed and no longer acts as a reinforcing material for the formed sheet. The stone sheet must instead be consolidated with a surface layer forming a sandwich sheet element, which, amongst other things, involves a complicated procedure and increased expense, and results in the production of "stone products" of great thickness and weight. Plastic is used as the filling material for this purpose.

The principal object of the present invention is thus, in the first place, to produce a stone product in sheet form capable of solving the aforementioned strength problems by simple but effective means and which, as such, is capable of, amongst other things, being manufactured with considerably less thickness than its earlier counterparts and of being used in both outdoor and indoor applications.

Said object is achieved by means of a product according to the present invention, which is characterized essentially in that the presence of an impregnating agent in existing pores, cracks and other cavities which may be present in the stone sheet increases its strength and flexibility.

A second object of the present invention is to identify a suitable method for producing a stone product in sheet form suitable for use both outdoors and indoors, for example as a facade cladding or a fitting, etc.

Said object is achieved by means of a method according to the present invention, which is characterized essentially in that the stone sheet in question is caused to be impregnated with an impregnating agent, in that the agent penetrates into existing pores and other cavities in the sheet, and in that the strength characteristics of the sheet are thereby increased.

Finally, a third object of the present invention is to identify means which can be applied simply and efficiently to the manufacture of a stone product in sheet form suitable for use both outdoors and indoors, for example as a facade cladding or a fitting, etc.

Said final object is achieved by means according to the present invention, which is characterized essentially in that water-glass, silicates or another substance with the ability to penetrate into the stone sheet in question and to increase the strength and flexibility of the stone sheet is used as the impregnating agent.

Figure 2:
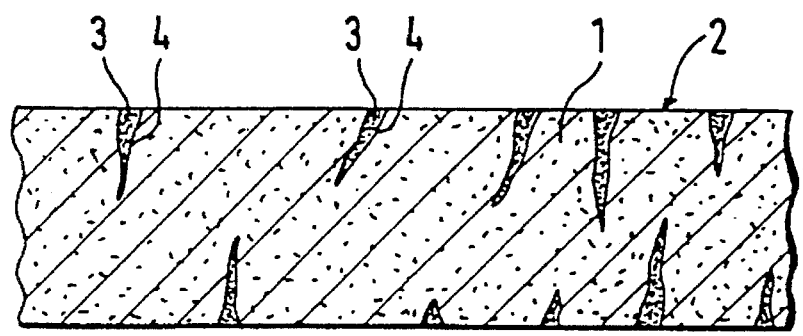
Figure 3:
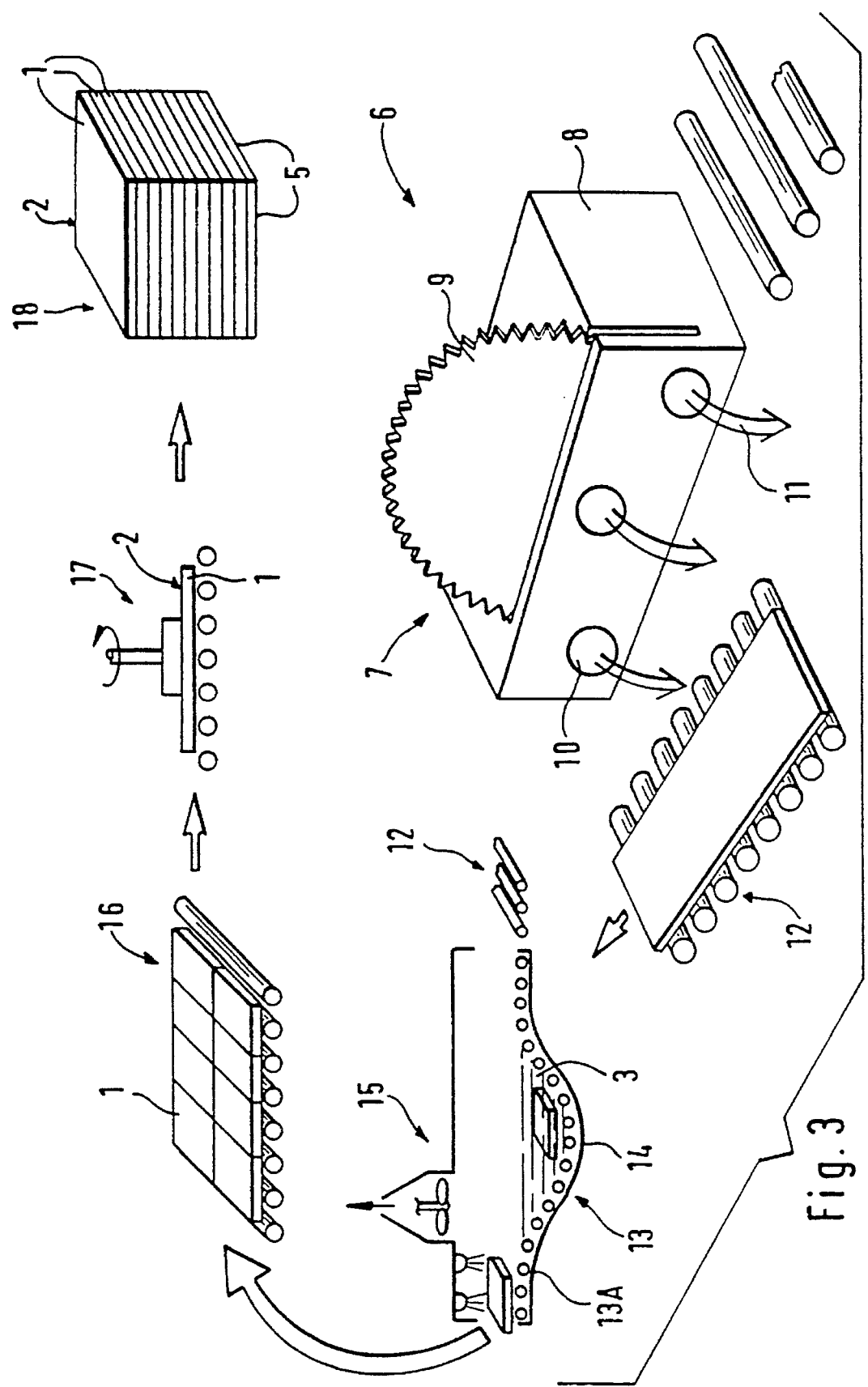

The invention is described below as a preferred illustrative embodiment with reference to the accompanying drawings, in which FIG. 1 shows a section through an untreated stone product in sheet form;

FIG. 2 shows a section through a stone product in sheet form treated in accordance with the present invention; and FIG. 3 is a schematic representation of a line, or at least a part of a line, for the manufacture of stone products in sheet form in accordance with the invention.

The present invention is based on the principle of using pressure to fill and reinforce the natural bonding between the stone crystals, predominantly granite and gneiss, and to bond, for example, any salts present in the stone, which can otherwise be precipitated out by acid rain and can cause discoloration of the stone.

A stone product in sheet form 1 in accordance with the present invention, which, for example, is suitable for use both outdoors and indoors, for example as a facade cladding or a fitting, etc., exhibits a small thickness of the order of 4–10 mm, and even as little as approximately 2 mm, in relation to the previous stone sheets which were considerably thicker so as to withstand the loads and stresses imposed on them. This is made possible by the stone product 1 in question having undergone impregnation treatment with a view to increasing at least the strength of the product 1. Thanks to the impregnation treatment, the stone product 1 exhibits small thickness T in relation to the overall surface area of the product, for example as little as approximately 2 mm.

The stone product 1 in question is able to exhibit in the conventional manner at least one polished or otherwise finely worked display surface 2.

A method of the kind envisaged in accordance with the present invention for the purpose of producing a stone product 1 in sheet form suitable for use both outdoors and indoors, for example as a facade cladding or a fitting, etc., involves causing the stone sheet 1 in question to be impregnated with an impregnating agent 3 of such a kind and in such a way that the agent 3 in question effectively penetrates into existing pores 4 and any other cavities, such as cracks, etc., which may be present in the sheet 1, and that the strength characteristics of the sheet are thereby increased considerably.

For the purpose of achieving the effective and "all-over" impregnation of the stone product in sheet form 1, it is desirable to cause moisture, air and the like to be "sucked" from the stone sheet 1 in conjunction with the impregnation, preferably before allowing the impregnating agent 3 to be introduced into the stone sheet 1. The aforementioned desirable effect is achieved by allowing impregnation to take place through so-called pressure-impregnation, for example at a pressure of approximately 0.8–1 MPa. Any cavities 4, etc., are emptied of air and liquid in this way, and the intended impregnating agent 3 flows in to take their place, penetrating deep into the stone sheet 1 from its surface 2. An even more advantageous effect is achieved by impregnating at high pressure, for example at up to approximately 15 MPa.

In accordance with the present invention, impregnation is performed using an impregnating agent 3 of a particular type, namely water-glass, silicate or, for example, some other suitable product which exhibits the same characteristics, in order to increase the strength and also the flexibility of the stone sheet 1 in question.

One or more existing side surfaces 2 and/or edge surfaces 5 of each stone sheet 1 should preferably also be impregnated, which can be achieved simply and efficiently by causing the desired impregnating agent to be applied by immersing the stone sheet 1 into an impregnating fluid 3.

As already stated above, means 3 for the manufacture of a stone product in sheet form 1 which is suitable for use both outdoors and indoors, for example as a facade cladding on buildings, for example, or as a fitting in buildings and vehicles, for example, consist of water-glass, silicates of a suitable form or some other product which has the effect of increasing the strength of the stone product 1 in question through being used as the impregnating agent for it.

An example of at least a part of a line 6 for the manufacture of thin stone products in sheet form 1 in accordance with the invention can consist of a dividing arrangement 7 for dividing a large block of stone 8 into a number of thin stone sheets 1, for example a saw 9 with a saw device, for example a rotating saw disc, capable of moving relative to the block of stone 8. Suction plugs 10 or other suitable holding devices are so arranged as to take a firm hold on a stone sheet 1 capable of being formed by sawing off, for example with approximate dimensions of 2×0.9 m, and as to hold the sheet 1 securely as it drops down to the side in the direction of the arrow 11 before being received on, for example, a conveyor 12 ready for subsequent impregnation. A plant 13 intended for pressure impregnation may consist of a trough 14 filled with an impregnating agent 3, preferably water-glass, silicates or other products which are suitable for impregnation use in order at least to increase the strength and the flexibility of the thin stone sheets 1 so as to permit them to be handled without fracturing, and also after manufacture during the subsequent handling and use of the stone. The pressure-impregnation plant 13 may be followed by a drying plant 15, which may be attached to the impregnation plant 13 at its exit end 13A. A conveyor 12 may extend for the entire length of the line in order to transport stone sheets 1 to subsequent stations 16, 17, 18, for example, where they are broken down into smaller sheets for polishing or grinding and for packing.

The invention is not restricted to the illustrative embodiment described above and illustrated in the drawings, but may be modified within the scope of the patent claims without departing from the idea of invention.

I claim:

1. Stone product in sheet form suitable for outdoors and indoors use as a facade cladding or a fitting comprising: the presence of an impregnating agent existing in the openings present in the stone sheet thereby increasing the strength and flexibility of the stone sheet.

2. The stone product of claim 1 comprising a thickness of approximately 2 mm to approximately 10 mm.

3. The stone product of claim 1, comprising at least one polished display surface.

4. The stone product of claim 1 wherein the impregnating agent comprises water-glass with the ability to penetrate into the stone sheet to increase the strength and flexibility of the stone sheet.

5. Method for producing stone product in sheet form which exhibits a thickness in relation to the overall product surface area and suitable for use both outdoors and indoors as a facade cladding or fitting, comprising the steps of impregnating a stone sheet with an impregnating agent substance with the ability to penetrate into the stone to fill the natural bonding between the stone crystals of the stone and permanently reinforce it with the impregnating agent, bonding the salts present in the stone, and preventing the salts from precipitating from the stone, applying the impregnating fluid by causing the stone sheet to be immersed in impregnating fluid by high pressure-impregnation at high pressure up to approximately 15 MPa, and causing moisture and air to be displaced from the stone sheet in conjunction with the impregnation.

6. The method of claim 5, comprising performing the impregnation by using water-glass to penetrate into pores and other cavities in the stone sheet in order to increase the strength and flexibility of the impregnated stone sheet.

7. The method of claim 5, comprising performing the impregnation by using silicates to penetrate into pores and other cavities in the stone sheet in order to increase the strength and flexibility of the impregnated stone sheet.

8. The method of claim 5, comprising impregnating at least one side surface of each stone sheet.

9. The method of claim 5, comprising impregnating at least one edge surface of each stone sheet.

10. The stone product of claim 1, comprising at least one finely worked surface.

11. The stone product of claim 1, wherein the impregnating agent comprises silicate capable of penetrating into the stone sheet and increasing the strength and flexibility of the stone sheet.

* * * * *